3,467,536
LIGHT-FAST CHLORINATED TERPHENYL CONTAINING LACQUERS
Kurt Hess, Leverkusen-Schlebusch, Heinrich Meckbach, Leverkusen, Karl Brandt, Opladen, and Hermann Wolz, Leverkusen, Germany, assignors to Farbenfabriken Bayer Aktiengesellschaft, Leverkusen, Germany, a corporation of Germany
No Drawing. Filed Jan. 31, 1967, Ser. No. 612,819
Claims priority, application Germany, Mar. 18, 1966, F 48,695
Int. Cl. C09d *3/00, 3/14*
U.S. Cl. 106—190          1 Claim

ABSTRACT OF THE DISCLOSURE

The addition of chlorinated terphenyls to lacquers and improvement of the light fastness of said lacquers by utilizing chlorinated terphenyls obtained by chlorination of a mixture of terphenyls containing up to 5% by weight of o-terphenyl.

---

This invention relates to light-fast lacquers with a content of highly chlorinated terphenyls.

Commercial lacquer components and highly chlorinated terphenyls which are essentially free of chlorinated ortho-terphenyl form, after drying, light-fast lacquer coatings. The chlorinated terphenyls used according to the invention contain before the chlorination besides m- and p-terphenyl and optionally a small amount of diphenyl 0–5% by weight of o-terphenyl.

It is known to chlorinate the high boiling residues of diphenyl production, which consist mainly of isomeric terphenyls, and to use the resulting chlorination products in combination with other suitable lacquer raw materials (see German Patent 934,699). One serious disadvantage of the lacquers produced from chlorinated terphenyls lies in their sensitivity to light, which manifests itself by strong yellowing in daylight.

The subject of the present invention is to process for the production of light fast lacquers containing chlorinated terphenyls, wherein the chlorinated terphenyls are obtained by chlorination of mixtures of terphenyls containing 0 to 5% by weight of o-terphenyl in addition to m- and p-terphenyl and optionally 0 to about 1% by weight of diphenyl.

It is preferable to use mixtures which before chlorination contain 0 to 3% by weight of o-terphenyl, based on the total terphenyl mixture.

Mixtures of m- and p-terphenyl containing little or no o-terphenyl can be obtained by known processes, such as fractional distillation or crystallisation from residues such as are obtained in the production of diphenyl, which residues contain up to 16% weight of o-terphenyl (see U.S. patent specification No. 2,489,215).

Another method of obtaining terphenyl mixtures containing little or no o-isomer consists in the isomerisation reaction of terphenyl mixtures containing o-, m- and p-isomers, in the presence of aluminum halides (see U.S. patent specification No. 2,363,209).

The o-terphenyl content in the terphenyl mixtures can conveniently be determined by gas chromatography.

Chlorination of the terphenyl mixtures to be used is carried out by known procedures, for example those described in Germany patent specification No. 934,669 or in U.S. patent specification No. 2,551,562. The chlorine contents of the chlorinated terphenyl mixtures may be from 20 to about 65% by weight, preferably 45 to 60% by weight.

It was surprising and not foreseeable that terphenyl mixtures which contain 0 to 5% by weight, preferable 0 to 3% by weight, of o-terphenyl would yield, after chlorination, products which are eminently suitable for the manufacture of light-fast lacquers which can be air- or oven-dried.

Examples of lacquer components which have good compatibility with the chlorinated terphenyl mixtures to be used according to the invention are chlorine rubber with chlorine contents of 60 to 70% by weight, cyclorubber, cellulose ethers such as methyl-, ethyl-, benzyl- and hydroxyethylcellulose, cellulose methylene ether, carboxymethylcellulose, cellulose esters such as cellulose propionate, -butyrate or -acetobutyrate, cellulose nitrate, homopolymers and copolymers of acrylic acid esters containing 1 to 18 C-atoms in the alcohol moiety, optionally with other olefinically unsaturated compounds such as unsaturated drying oils or unsaturated alkyd resins produced from such compounds, unsaturated polyesters and copolymers of vinyl chloride or vinylidene chloride with other copolymerisable monomers such as ethylene and/or vinyl acetate, copolymers of butadiene and styrene, drying oils such as linseed oil, wood oil, tall oil, and styrenised alkyd resins.

Preferred are used cyclorubber, chlorine rubber with chlorine content of 60 to 70% by weight, copolymers of acrylic esters containing 1 to 18 C-atoms in the ester group and linseed oil, wood oil, tall oil, styrenised alkyd resins, unsaturated alkyd resins or unsaturated polyesters, copolymers of vinyl- or vinylidene chloride with ethylene and/or vinyl acetate and copolymers of butadiene and styrene.

Moreover, the chlorinated terphenyl mixtures used according to the invention have good compatibility with plasticisers such as phthalic acid esters or phosphoric acid esters and with inorganic or organic pigments, fillers and solvents.

The quantities in which the terphenyl mixtures are used according to the invention are 5 to 100% by weight, preferably 10 to 15% by weight, based on the lacquer components used. By lacquer component is meant the polymers, polycondensation products and drying oils mentioned above but not the plasticisers, fillers, solvents and pigments.

In principle it is also possible to chlorinate pure m- or p-terphenyl and to use this for the production of lacquers.

PREPARATION OF STARTING MATERIALS (1) Chlorinated terphenyl mixture A 400 g. of a commercial terphenyl mixture containing, 0.2% by weight of diphenyl, 12.6% by weight of o-terphenyl, 58.8% by weight of m-terphenyl and 28.4% by weight of p-terphenyl are chlorinated at 155 to 172° C. in the presence of 4 g. of sublimed ferric chloride, by passing through 50 litres of chlorine per hour for 8 hours until the density is 1.459 measured at 150° C. Air is blown through the resulting chloroterphenyl mixture until it is neutral. Yield 810 g.

*Purification of the product.* —500 g. of the crude product are distilled at 2 to 5 mm. pressure in the presence of 10 g. of soda and 10 g. of fuller's earth. 464 g. of chlorinated terphenyl mixture distil over at 190 to 340° C. The chlorinated terphenyl mixture has a pale green colour, a softening point of 77° C. and a total chlorine content of 53.8%. The resulting chlorinated product will be termed "chlorinated terphenyl mixture A" in the following example.

(2) Chlorinated terphenyl mixture B 350 g. of a commercial terphenyl mixture containing 0.4% by weight of diphenyl, 1.1% by weight of o-terphenyl, 70.2% by weight of m-terphenyl and 28.3% by weight of p-terphenyl are chlorinated until its density is 1.459, measured at 150° C., by the introduction of 50 litres of chlorine per hour for 10 hours at 155 to 170° C. in the presence of 3.5 g. of sublimed ferric chloride. When the product has been washed neutral with air, the yield of crude product is 708 g.

*Purification of the crude product.*—500 g. of the crude product are distilled at 2 to 5 mm. pressure in the presence of 10 g. of soda and 10 g. of fuller's earth. The chlorinated terphenyl mixture (466 g.) which distils over between 190 and 340° C. has a slight pale green colour. It has a softening point of 69° C. and a total chlorine content of 53.85% by weight. The product obtained will be termed "chlorinated terphenyl mixture B" in the following example.

(3) Chlorinated terphenyl mixture C 500 g. of a commercial terphenyl mixture containing 1.0% by weight of diphenyl, 3.1% by weight of o-terphenyl, 61.6% by weight of m-terphenyl and 34.1% by weight of p-terphenyl are chlorinated until its density is 1.460, measured at 150° C., by the introduction of 50 litres of chlorine per hour at 169 to 179° C. for 10 hours in the presence of 5 g. of sublimed ferric chloride. After the crude product has been washed out with a current of air, it is obtained in a yield of 995 g.

*Purification of the crude product.*—500 g. of the crude product are distilled under a pressure of 2 to 5 mm. in the presence of 10 g. soda and 10 g. fuller's earth. 467 g. of a slightly greenish chlorinated terphenyl mixture, which has a softening point of 77° C. and total chlorine content of 53.65% by weight, distils over at 190 to 340° C. The product obtained will be termed "chlorinated terphenyl mixture C" in the following example.

| Lacquer film from cellulose acetobutyrate and | Measured lacquer films (in divisions on the scale) | | |
|---|---|---|---|
| | Before exposure to light | After exposure to light | Difference |
| Chlorinated terphenyl mixture A (comparison test) | 0.0045 | 0.0333 | 0.0288 |
| Chlorinated terphenyl mixture B (according to the invention) | 0.0072 | 0.0106 | 0.0034 |
| Chlorinated terphenyl mixture C (according to the invention) | 0.0047 | 0.0125 | 0.0078 |

EXAMPLE 100 g. portions of chlorinated terphenyl mixtures A, B and C are each mixed with 100 g. of cellulose acetobutyrate dissolved in 50 g. of xylene and 50 g. of ethyl acetate. This lacquer solution is painted onto white cardboard and dried for 12 hours at room temperature. Portion of each of the dried lacquer samples is then exposed to light for 3 days in a xenon test apparatus. Yellowing is subsequently determined by means of a filter photometer (Elrepho) with U.V. blocking filter. The yellowing of the lacquer film is measured as the distance of the colour type from the ideal achromatic point in units of the CIE Standard Colour Table according to DIN 5033. In the given region, this distance is directly proportional to the visible yellowing. It should be noted that both the yellowing of the lacquer film and that of the cardboard on which the lacquer was applied are included in the observed results. Since yellowing of the cardboard is the same in all instances; accurate relative results are obtained although the results are not absolute.

The results become clear if the difference between the measured values of the comparison test (that is the value 0.0288) is stated as 100. Then the difference 0.0034 of the chlorinated terphenyl mixture B corresponds to the value 11.8 and the difference (0.0078) of the chlorinated terphenyl mixture C to the value of 27.1. It is clear from this that the lowest values 11.8 and 27.1 are the best and that the improvement in light fastness is inversely proportional to the chlorinated o-terphenyl content.

We claim:
1. A lacquer composition comprising (A) cellulose acetobutyrate, and (B) 5 to 100% by weight, based on the weight of component (A), of a chlorinated terphenyl having a chlorine content of 20 to about 65% by weight, said chlorinated terphenyl being the chlorination product of a mixture of isomeric terphenyls containing not more than 5% by weight of o-terphenyl and not more than about 1% by weight of diphenyl.

References Cited
UNITED STATES PATENTS 2,486,012 10/1949 Ernst _____ 106—190
3,049,503 8/1962 Milionis et al. _____ 106—190

ALLAN LIEBERMAN, Primary Examiner

U.S. Cl. X.R.
260—45.9